(12) United States Patent
Doyle

(10) Patent No.: US 6,356,886 B1
(45) Date of Patent: *Mar. 12, 2002

(54) APPARATUS AND METHOD FOR COMMUNICATING WITH A KNOWLEDGE BASE

(75) Inventor: Richard B. Doyle, Auburn Hills, MI (US)

(73) Assignee: Electronic Data Systems Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/566,432

(22) Filed: Nov. 30, 1995

(51) Int. Cl.$^7$ .............................................. G06F 17/00
(52) U.S. Cl. .......................................... 706/46; 706/45
(58) Field of Search .............................. 395/10, 11, 54, 395/62; 707/3, 103; 706/10, 45, 50, 53, 46

(56) References Cited

U.S. PATENT DOCUMENTS

| | | | | |
|---|---|---|---|---|
| 4,949,278 A | * | 8/1990 | Davies | 706/10 |
| 4,972,328 A | * | 11/1990 | Wu | 706/10 |
| 5,063,522 A | * | 11/1991 | Winters | 706/10 |
| 5,212,787 A | * | 5/1993 | Baker | 707/103 |
| 5,257,185 A | | 10/1993 | Farley et al. | 364/419.19 |
| 5,325,505 A | | 6/1994 | Hoffecker et al. | 395/425 |
| 5,412,758 A | * | 5/1995 | Srikanth | 706/59 |
| 5,428,619 A | | 6/1995 | Schwartz et al. | 371/20.1 |
| 5,432,940 A | * | 7/1995 | Potts et al. | 395/700 |
| 5,465,351 A | | 11/1995 | Lemmo | 395/600 |
| 5,615,112 A | * | 3/1997 | Sheng et al. | 707/104 |
| 5,615,360 A | * | 3/1997 | Bezek | 707/103 |
| 5,680,615 A | * | 10/1997 | Marlin | 707/103 |
| 5,689,698 A | * | 11/1997 | Jones | 707/103 |
| 5,754,841 A | * | 5/1998 | Carino | 707/103 |
| 5,765,159 A | * | 6/1998 | Srinivasan | 707/103 |
| 5,826,085 A | * | 10/1998 | Bennett et al. | 395/683 |
| 5,832,498 A | * | 11/1998 | Exterier | 707/103 |
| 5,838,965 A | * | 11/1998 | Kavanagh et al. | 707/103 |
| 6,169,992 B1 | * | 1/2001 | Beall et al. | 707/103 |

OTHER PUBLICATIONS

Su et al., "An Integrated Object–Oriented Knowledge Base Management System OSAM* .KBMS/ROSE for Supporting Design and Manufacturing," Proceddings of the Second International Conference on Systems Integration, Jun. 1992, pp. 152–161.*

Pedersen et al., "Data and Knowledge Bases as Integral Parts of a Distributed Object Infrastructure," Proceedins of the First International Workshop on Interoperability in Multidatabase Systems, Apr. 1991, pp. 101–107.*

Shi et al., "OKBMS: An Object–Oriented Knowledge Base management System," Proceedings of the Second International IEEE Conference on Tools for Artificial Intelligence, Nov. 1990, pp. 161–166.*

(List continued on next page.)

Primary Examiner—George B. Davis
(74) Attorney, Agent, or Firm—Baker Botts L.P.

(57) ABSTRACT

Apparatus and method for communicating with a knowledge base (16) employs an interface (12) operable to receive a message initiated by an application (20), to translate the message to a knowledge base message cognizable by the knowledge base (16), and to communicate the knowledge base message to the knowledge base (16). In a client-server embodiment, the interface (12) comprises a client interface (40) coupled to the application (20), a server interface (42) coupled to the knowledge base 16, and a link (44) coupled between the client interface (40) and the server interface (42).

20 Claims, 3 Drawing Sheets

OTHER PUBLICATIONS

"Object–Oriented Databases," James Martin, Chapter 19, Principles of Object–Oriented Analysis and Design. PTR Prentice Hall, Englewood Cliffs, NJ, pp. 301–320, 1993.*

D.W. Franke, "Imbedding Rule Inferencing in Applications," IEEE Expert, vol. 5, No. 6, pp. 8–14, Dec. 1990.*

Stubee, J. "Communications Center Automation" IEEE Military Communications Conference, Oct. 1994.*

"PC AI" Intelligent Solutions for Desktop Computers, Multimedia, Nov./Dec. 1992, Advertisement page, "Eclipse 3.1 With Easy Reasoner™," The Haley Enterprise, Inc.

"Developing Expert System Knowledge Bases in Technical Training Environments," William B. Johnson, Section 1, Intelligent Tutoring Systems—Lessons Learned, edited by Joseph Psotka, L. Dan Massey, Sharon A. Mutter, pp. 21–33, © 1988.

"What Mental Model Should Be Taught: Choosing Instructional Content for Complex Engineered Systems," David E. Kieras, Section 4, Intelligent Tutoring Systems—Lessons Learned, edited by Joseph Psotka, L. Dan Massey, Sharon A. Mutter, pp. 85–111, © 1988.

"Bridge Tutoring the Programming Process," Jeffrey G Bonar, Robert Cunningham, Section 15, Intelligent Tutoring Systems—Lessons Learned, edited by Joseph Psotka, L. Dan Massey, Sharon A. Mutter, pp. 409–434, © 1988.

"Understanding Reflective Problem Solving," Wallace Feurzeig, Frank Ritter, Section 16, Intelligent Tutoring Systems—Lessons Learned, edited by Joseph Psotka, L. Dan Massey, Sharon A. Mutter, pp. 435–450, © 1988.

"The Next Wave of Problems in ITS: Confronting the "User Issues" of Interface Design and System Evaluation," Douglas Frye, David C. Littman, Elliot Soloway, Section 17, Intelligent Tutoring Systems—Lessons Learned, edited by Joseph Psotka, L. Dan Massey, Sharon A. Mutter, pp. 451–478, © 1988.

"The Intelligent Maintenance Training System," Douglas M. Towne, Allen Munro, Section 18, Intelligent Tutoring Systems—Lessons Learned, edited by Joseph Psotka, L. Dan Massey, Sharon A. Mutte, pp. 479–530, © 1988.

"Foundations of Intelligent Tutoring Systems: An Introduction," Hugh L. Burns, Charles G. Capps, Section 1, Foundations of Intelligent Tutoring Systems, edited by Martha C. Polson, J. Jeffrey Richardson, pp. 1–19, © 1988.

"The Expert Module," John R. Anderson, Section 2, Foundations of Intelligent Tutoring Systems, edited by Martha C. Polson, J. Jeffrey Richardson, pp. 21–53, © 1988.

"Evaluating ITSs: The Cognitive Science Perspective," David Littman, Elliot Soloway, Section 8, Foundations of Intelligent Tutoring Systems, edited by Martha C. Polson, J. Jeffrey Richardson, pp. 209–242, © 1988.

"The Mathematics of Inheritance Systems," David S. Touretzky, Chapter 3, Morgan Kaufmann Publishers, pp. 79–100, © 1986.

"The Evolution of Intelligent Tutoring Systems: Dimensions of Design," Hugh Burns, James W. Parlett, Chapter 1, Intelligent Tutoring Systems: Evolutions in Design, edited by Hugh Burns, James W. Parlett, Carol Luckhardt Redfield, pp. 1–11, © 1991.

"Interface Architectures for Intelligent Tutoring Systems," Jeffrey G. Bonar, Chapter 3, Intelligent Tutoring Systems: Evolutions in Design, edited by Hugh Burns, James W. Parlett, Carol Luckhardt Redfield, pp. 35–67, © 1991.

"Designing XCMD's and XFCN's," Gary Bond, XCMD's for Hypercard, Chapter 1, pp. 1–14, © 1988.

"Understanding XCMD's and XFCN's," Gary Bond XCMD's for Hypercard, Chapter 2, pp. 15–50, © 1988.

"Accessing Hypercard's Internal Structures," Gary Bond, XCMD's for Hypercard, Chapter 3, pp. 51–140, © 1988.

"Automated Theorem–Provers," Michael Yoeli, Chapter 4, Formal Verification of Hardware Design, pp. 79–96, © 1990.

"Education," John Durkin, Expert Systems Catalog of Applications, pp. 94–108, © 1993.

"IMEC's CATHEDRAL–II System," edited by Robert A. Walker, Raul Camposano, A Survey of High–Level Synthesis Systems, pp. 108–131, © 1991.

"Client/Server Computing," Dawna Travis Dewire, McGraw–Hill, Inc., 339 pages, © 1993.

"Performance Modelling of Communication Networks and Computer Architectures," Peter G. Harrison, Naresh M. Patel, Addison–Wesley Publishing, 472 pages, © 1992.

"Communications for Cooperating Systems OSI, SNA, and TCP/IP," R.J. Cypser, The Systems Programming Series, Addison–Wesley Publishing, 743 pages, © 1991.

"Unified Theories of Cognition," Allen Newell, Harvard University Press, 549 pages, © 1990.

"Automating the Design of Computer Systems, The Micon Project," William P. Birmingham, Anurag P. Gupta, Daniel P. Siewiorek, Jones and Bartlett Publishers, 278 pages, © 1992.

"Artificial Intelligence, Structures and Strategies for Complex Problem Solving," George F. Luger, William A. Stubblefield, The Benjamin/Cummings Publishing Company, Second Edition, 740 pages, © 1993.

"Introduction to Compilers," Alfred V. Aho, Jeffrey D. Ullman, Chapter 1, Principles of Compiler Design, pp. 1–25, ©1997.

"Lexical Anaylsis," Alfred V. Aho, Jeffrey D. Ullman, Chapter 3, Principles of Compiler Design, pp. 73–124, ©1997.

"Basic Parsing Techniques," Alfred V. Aho, Jeffrey D. Ullman, Chapter 5, Principles of Compiler Design, pp. 145–196, ©1997.

"Syntax–Directed Translation," Alfred V. Aho, Jeffrey D. Ullman, Chapter 7, Principles of Compiler Design, pp. 245–295, ©1997.

"CLIPS Version 6.0," Joseph C. Giarratano, Ph.D., CLIPS Version 6.0, Software Technology Branch, Johnson Space Center, User's Guide, 162 pgs, May 28, 1993.

"CLIPS Reference Manual, vol. II, Advanced Programming Guide," Joseph C. Giarratano, Ph.D., CLIPS Version 6.0, Software Technology Branch, Johnson Space Center, 220 pgs, Jun. 2, 1993.

"CLIPS Reference Manual, vol. III, Interfaces Guide," Joseph C. Giarratano, Ph.D., CLIPS Version 6.0, Software Technology Branch, Johnson Space Center, pp. 13–113, Jun. 2, 1993.

"CLIPS Version 6.0, vol. I, Basic Programming Guide," Software Technology Branch, Johnson Space Center, 368 pgs, Jun. 2, 1993.

* cited by examiner

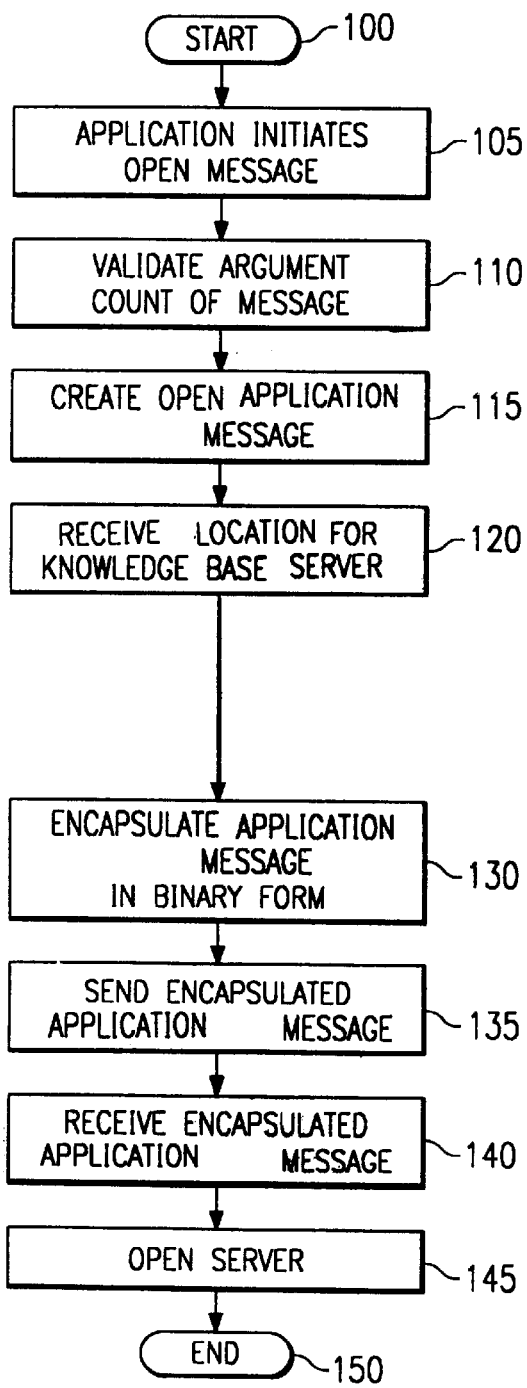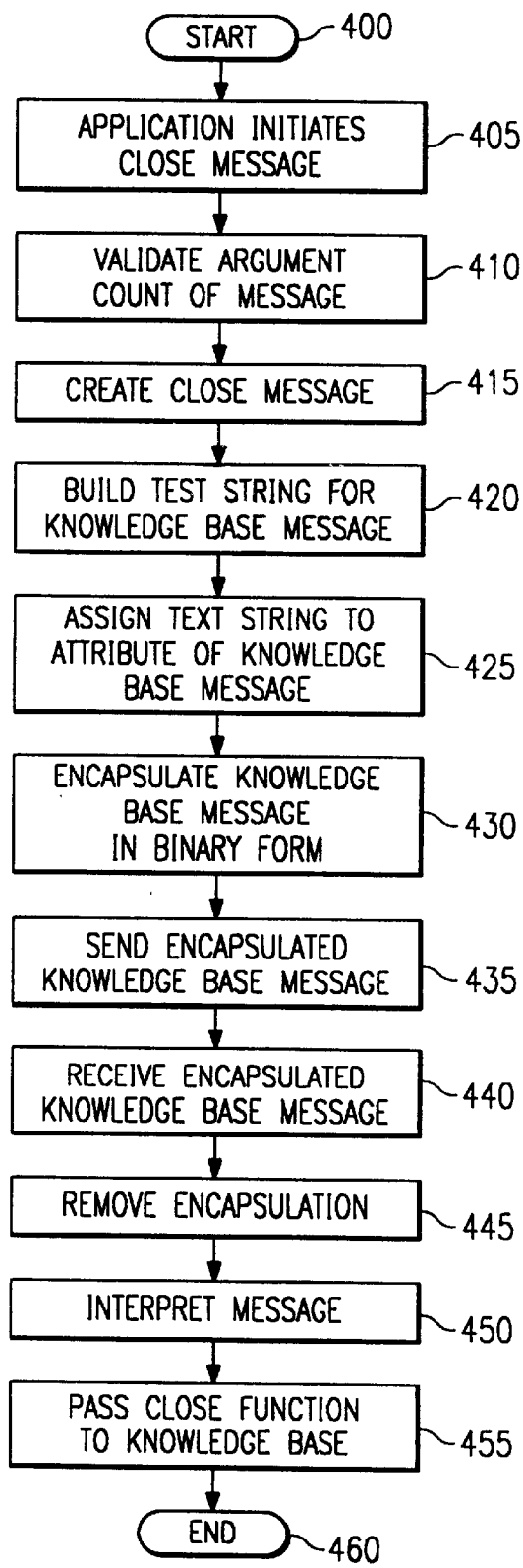

APPARATUS AND METHOD FOR COMMUNICATING WITH A KNOWLEDGE BASE

TECHNICAL FIELD OF THE INVENTION

This invention relates in general to knowledge systems, and more particularly to a method and apparatus for communicating with a knowledge base.

BACKGROUND OF THE INVENTION

Knowledge systems are computer-based systems that emulate human reasoning by using an inference engine to interpret encoded knowledge that is stored in a knowledge base. If the domain of the knowledge base is sufficiently narrow and a sufficiently large body of knowledge is properly coded in the knowledge base, then the knowledge system can achieve performance that may approach, match or even exceed the ability of human experts.

Knowledge systems are often employed as an on-line reference, as a computer-based training tool, or as a problem-solving tool. Typically, a knowledge system is implemented by binding an application to a knowledge base. The application is bound to the knowledge base by directly intermeshing the messaging system of the application with that of the knowledge base. As a result, the application and the knowledge base are fully integrated and thereby able to communicate.

Such customization that unites the application with the knowledge base, however, is expensive. Moreover, intermeshing the application messaging system prevents communication with other resources. Additionally, the customization generally requires the application to run on the knowledge base platform. Thus, the features and the tools available to the application are limited to those that are provided by the knowledge base platform.

SUMMARY OF THE INVENTION

In accordance with the present invention, an apparatus and method for communicating with a knowledge base is provided that substantially eliminates or reduces the disadvantages and problems associated with prior knowledge systems.

In accordance with one embodiment of the present invention, an apparatus for communicating between a knowledge base and an application includes an interface coupled to the knowledge base and to the application. The application may be an on-line reference program, a computer-based training program, a problem solving program, or another type of program capable of initiating messages for knowledge base operations. The interface receives and translates messages initiated by the application. Each message is translated to a knowledge base message that is cognizable by the knowledge base. The interface then communicates the knowledge base message to the knowledge base.

More specifically, the present invention includes a suite of knowledge base messages for translating the message initiated by the application. The knowledge base message may be an object-oriented message capable of accessing an object of the knowledge base. Additionally, the interface may receive a reply from the knowledge base. The reply is translated to an application reply that is cognizable by the application. The interface communicates the application reply to the application.

In a client-server embodiment of the present invention, a distributed knowledge system includes a link for communicating between an application and a knowledge base. The application is coupled to a client interface that receives and translates messages initiated by the application. Each message is translated to a knowledge base message that is cognizable by the knowledge base. The knowledge base message is sent to the knowledge base via the link. The message is received by a server interface that is coupled to the knowledge base. The server interface communicates the knowledge base message to the knowledge base. More specifically, prior to sending a message via the link, the client interface may encode the knowledge base message. In such case, the server interface decodes the knowledge base message received from the link.

Additionally, the server interface may receive a reply from the knowledge base. The server interface sends the reply to the client interface via the link. At the client interface, the reply is translated to an application reply that is cognizable by the application. The client interface communicates the application reply to the application.

Important technical advantages of the present invention include a knowledge system having an interface of modular design for use with different types of applications. In particular, an application need not be customized now in order to communicate with a knowledge base. Accordingly, the present invention provides an affordable knowledge system by eliminating the cost of such customization.

Another important technical advantage of the present invention includes providing a knowledge system with increased capabilities. In particular, the present invention allows an application to access the knowledge base over a network. Accordingly, the application can be run on a platform that is best suited for the application's needs. Moreover, the ability to access a knowledge base over a network also allows for more sophisticated application programs that can use a knowledge base in conjunction with a relational data base and other problem solving tools. Therefore, the present invention greatly increases the power and versatility of knowledge systems.

Still another technical advantage of the present invention includes providing a knowledge system with increased ease of use. In particular, the method and apparatus of the present invention for communicating with a knowledge base are transparent to the user. Accordingly, a user need not learn superfluous skills to operate the knowledge system of the present invention.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which:

FIG. 3 is a flow chart of a method for initiating a knowledge base session;

FIG. 5 is a flow chart of a method for terminating a knowledge base session.

DETAILED DESCRIPTION OF THE INVENTION

Figure 1:
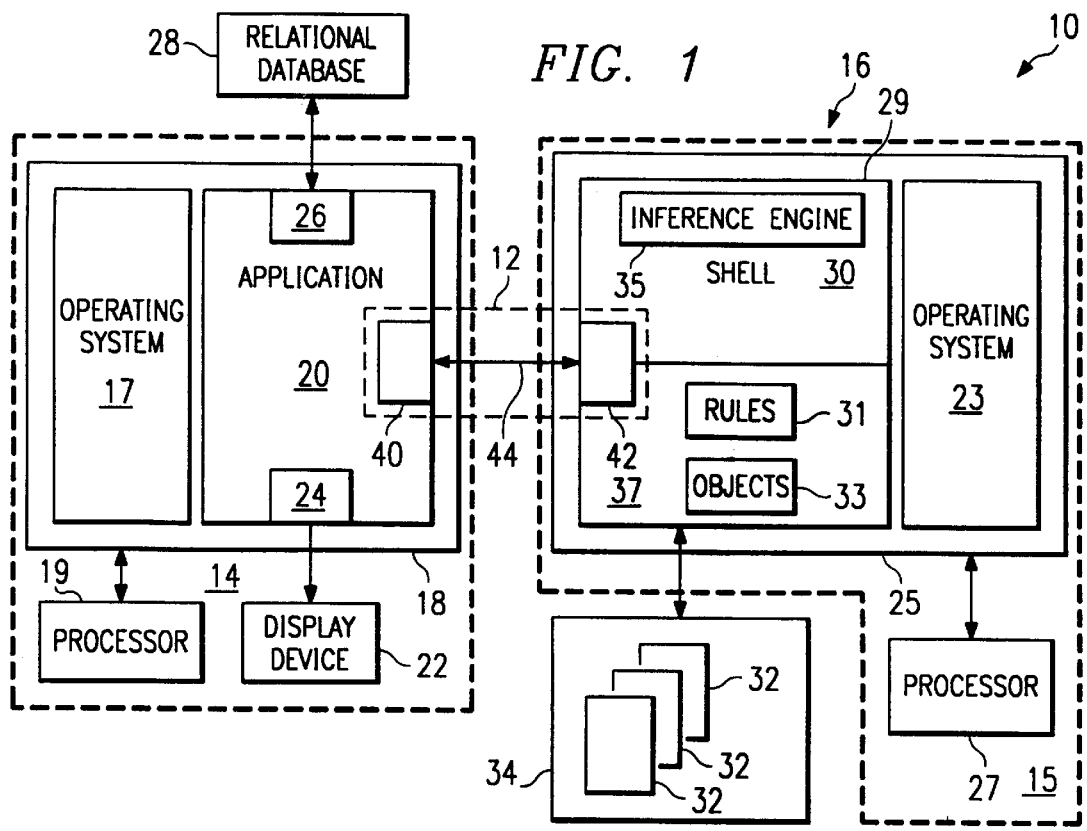
FIG. 1 illustrates a simplified block diagram of a distributed knowledge system.

Referring now in more detail to the drawings, in which like numerals refer to like parts throughout the several views, FIG. 1 is a schematic block diagram of a distributed knowledge system 10 incorporating an interface 12 in accordance with the present invention. As shown by FIG. 1, the distributed knowledge system 10 includes a workstation 14 and a knowledge base server 15 that communicate using interface 12.

Workstation 14 comprises an operating system 17 stored in a memory 18. Operating system 17 operates the workstation 14 in conjunction with a central processing unit 19 to retrieve, process, store, manipulate, or display data.

An application 20 is stored in memory 18. Application 20 may be an on-line reference program, a computer-based training program, a problem solving program, or another program capable of initiating messages for knowledge base operations.

The application 20 includes a user interface 24 for communicating with the display device 22 and a relational database interface 26 for communicating with a relational database 28. The user interface 24 is coupled to the display device 22. The relational database interface 26 is coupled to the relational database 28 using link 44 that forms part of the interface 12. The components of the interface 12 will be described more completely below.

The knowledge base server 15 comprises an operating system 23 stored in a memory 25. Operating system 23 operates the knowledge base server 15 in conjunction with a central processing unit 27 to retrieve, process, store, manipulate, or display data.

A knowledge base 16 is stored in memory 25. The knowledge base 16 incorporates a unified cognition architecture 29 and includes a series of rules 31 and a collection of objects 33. Unified cognition architecture 29 uses the series of objects 33 in place of the slots of typical knowledge bases. Each rule 31 defines a pattern that if found will invoke an action associated with the rule 31. The action may, for example, assert, modify or retract an object 33. An object 33 is an instance of a class, which is a representation of an abstract data type.

The knowledge base 16 includes a shell 30 and working memory 37. The shell 30 includes an inference engine 35 to interpret coded knowledge stored in the working memory 37. A plurality of knowledge base files 32 can be stored on a separate storage device 34 and loaded into working memory 37 as needed.

The interface 12 includes a client interface 40 and a server interface 42 coupled to a link 44. Link 44 may be wireless or wireline, a network, or any other type of link capable of communicating data. The architecture of the interface 12 will be described more completely with reference to FIG. 2. However, in general, the application 20 initiates a message that is received by the interface 12. The interface 12 translates the message to a knowledge base message that is cognizable by the knowledge base 16. Thereafter, the knowledge base message is communicated to the knowledge base 16. If the knowledge base 16 responds with a reply, the interface 12 translates the reply to an application reply that is cognizable by the application 20. Thereafter, the application reply is communicated to the application 20.

According to a specific embodiment of the present invention, the knowledge system 10 is implemented as an intelligent tutoring system for computer-based training. Under this embodiment, the work station 14 is a "MACINTOSH" platform (system 7.x) manufactured by "APPLE COMPUTER". System 7.x includes a standardized message passing architecture that was not present in previous versions. Accordingly, if earlier versions are used, a customized interprocess communication subsystem may need to be devised. Under this specific embodiment, the client application 20 comprises courseware running in "AUTHORWARE" (system 7.x) with "HYPERTALK" (system 2.x.). "AUTHORWARE" is manufactured by "MACROMEDIA". "HYPERTALK" is manufactured by "APPLE COMPUTER".

Under this specific embodiment, the interface 12 is implemented using "HYPERTALK" extensions, including the "XCMD" interface, and "IAC CLASSES" for "PROGRAPH" (version 2.5), which is manufactured by "PICTORIUS". "IAC CLASSES" provide a general purpose interprocess communication subsystem for "MACINTOSH" (System 7.x).

Under this specific embodiment, the knowledge base 16 is a "CLIPS" knowledge base (version 6.0) running on a "MACINTOSH" platform (system 7.x). The "CLIPS" knowledge base is a product of NASA's Johnson Space Center and is sold through COSMIC of the University of Georgia. The CLIPS knowledge base incorporates a unified cognition architecture using rules and objects as described above.

Figure 2:
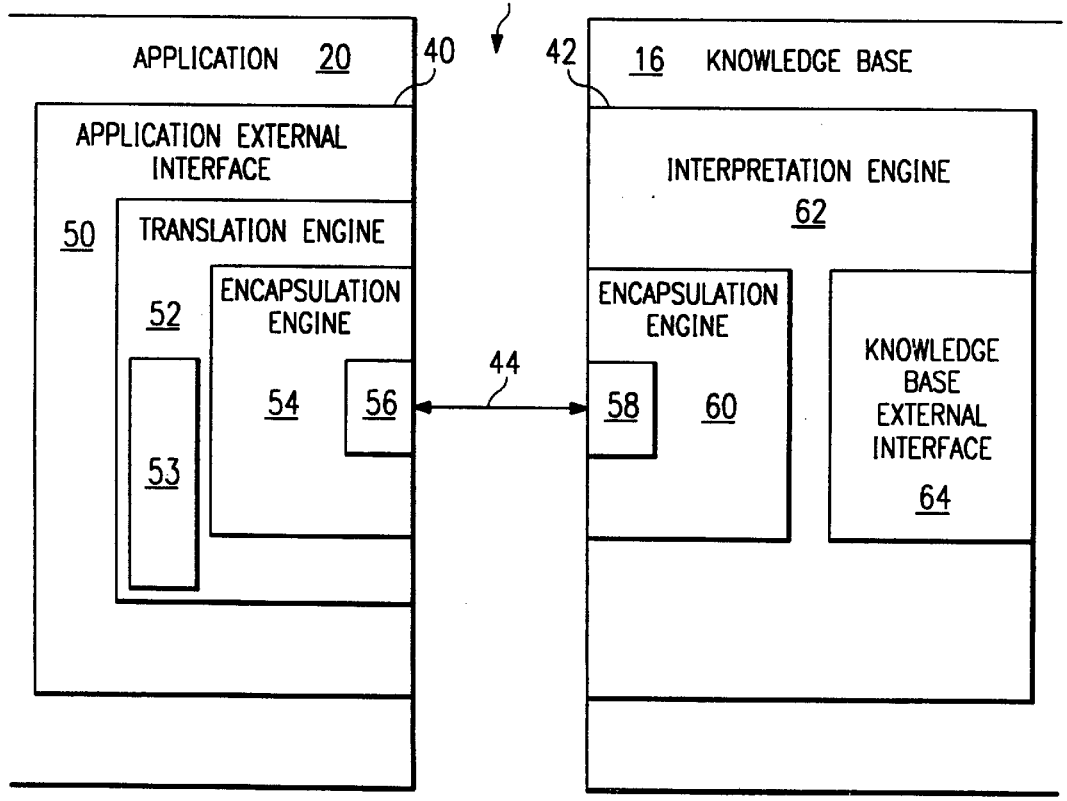
FIG. 2 illustrates a detailed block diagram of the interface of the distributed knowledge system.

FIG. 2 is a detailed block diagram which illustrates the architecture of interface 12 for the distributed knowledge system 10. As shown by FIG. 2, and previously discussed, the interface 12 includes the client interface 40, the server interface 42, and the link 44. The client interface 40 and the server interface 42 are designed to receive a message from the application 20 for knowledge base operations, to translate the message to a form that is cognizable by the knowledge base 16, and to communicate the message to the knowledge base 16. If the knowledge base 16 responds with a reply, the client interface 40 and the server interface 42 are designed to translate the reply to a form that is cognizable by the application 20 and communicate the reply to the application 20.

Specifically, the client interface 40 comprises a series of component layers for message processing. The application 20 initiates a message for a specific knowledge base operation. An application external interface 50 is coupled to application 20 and directs the message to a translation engine 52. The translation engine 52 translates the message to a knowledge base message cognizable by the knowledge base 16. The translation engine 52 includes a suite of knowledge base messages 53 for translating the message to the knowledge base message. As used herein, the term "translate" means to turn from one language or system of representation to another such language or system. In accordance with one embodiment of the present invention, a message is translated by determining which knowledge base message from the suite of knowledge base messages 53 corresponds to the message and employing that knowledge base message.

The translation engine 52 is coupled to an encapsulation engine 54 that encapsulates the knowledge base message in binary form for transmission over the link 44. In encapsulating the knowledge base messages the encapsulation engine 54 maps the knowledge base message from a logical representation to a physical representation so that it can be sent over the link 44. The encapsulation engine 54 is coupled with a messaging system 56 that sends the encapsulated knowledge base message over the link 44 and that receives encapsulated messages from the link 44.

The server interface 42 comprises a series of component layers for message processing. A messaging system 58 receives the encapsulated knowledge base message from the link 44 and also sends encapsulated messages over the link 44. The messaging system 58 is coupled to an encapsulation engine 60 that removes the encapsulation from the knowledge base message. In removing the encapsulation, the encapsulation engine 60 maps the knowledge base message from a physical representation to a logical representation for processing. The encapsulation engine 60 is coupled to an interpretation engine 62 that calls knowledge base operations corresponding to the knowledge base message. The calls are passed from the interpretation engine 62 to a knowledge base external interface 64 that interacts directly with the knowledge base 16.

The process of the present invention for communications in the client-server distributed knowledge system 10 will now be described. It will be understood by those skilled in the art, however, that the method of the present invention can be used with a knowledge system of a different design. For example, the client application may be run on the knowledge base platform thereby eliminating the need for the link 44 and for the components and steps that support network communications. It will be understood, however, that such a knowledge system would lose the technical advantage of running the application 20 on a platform best suited for the application 20.

One embodiment of the present invention utilizes a suite of twelve messages to operate the knowledge base 16 in response to requests from the application 20. These messages are open server, load, reset, assert, retract, modify, query instance, query slot, solve, send, status and close server. Other messages consistent with the functionality and operation of a particular implementation may be developed without departing from the scope of the present invention. Additionally, it will be understood that a message suite including only some of these messages may be used within the scope of the present invention.

The open server message launches the knowledge base 16. The load message loads a specified knowledge base file 32 to working memory 37. The reset message resets the current knowledge base 16 to its initial state. The assert message creates and stores the specified instance in knowledge base working memory. The retract message deletes the specified instance from knowledge base working memory. The modify message modifies specified slots of the specified instance. The query instance message issues the instance query to the knowledge base 16. The query slot returns the specified slot values from the specified instances. The solve message asserts the specified goal. The send message sends the specified message to the specified instance. The status message returns the current status of the knowledge base 16. The close server message shuts down the knowledge base 16.

Of the messages, the open server and the close server messages are non-scripted and do not return reply data. The remaining messages are scripted and may return reply data from the knowledge base 16. The scripted messages are preferably object-oriented and therefore able to take advantage of the unified cognition architecture of the knowledge base 16. In particular, the object-oriented messages are able to implement functions that are not otherwise available from the knowledge base external interface 64 as behaviors of objects 33 in the knowledge base 16.

The method of the present invention for opening the knowledge base 16 is shown by FIG. 3. The method begins at step 100 and proceeds to step 105. At step 105, the application 20 initiates an open server message. The application external interface 50 directs the open server message to the translation engine 52. Next, at step 110, the translation engine 52 validates the message. The message is validated by conducting an argument count in which the arguments of the message are counted and compared to the number of arguments expected for that particular message.

Next, at steps 115–120, the open server message is translated to an application message. At step 115, an application message is created in the translation engine 52 to open the knowledge base 16. An application message is created by building a logical representation of the open server message. Next, at step 120, the location of the knowledge base server is retrieved. If a "MACINTOSH" platform is used with system 7.x, the location of the knowledge base server may be retrieved from the operating system 17. In such a case, the location is received in the form of a binary structure that describes the location of the knowledge base server. At this point, the translation is complete and the application message is passed from the translation engine 52 to the encapsulation engine 54.

At step 130, the application message is encapsulated in binary form. In encapsulating the application message, the encapsulation engine 54 maps the message from a logical representation to a physical representation so that it can be sent over the link 44. If a "MACINTOSH" platform is used with system 7.x, the message may be encapsulated by requesting from the message object a descriptor of the message. In response, the message object systematically invokes the low level operating system 17 functions necessary to build an encapsulated message. The message object invokes the low level functions by using the previously identified "IAC CLASSES". The message object returns with the message in binary form, and as a pointer.

After the application message has been encapsulated, the pointer for the application message is passed from the encapsulation engine 54 to the message system 56.

Next, at step 135, the message system 56 sends the encapsulated application message as a pointer reference over the link 44.

Next, at step 140, the encapsulated application message for opening the knowledge base 16 is received from the link 44 by the message system 58 of the server interface 42. The message system 58 passes the application message to the operating system 23 of the knowledge base platform which then launches the knowledge base 16.

Figure 4:
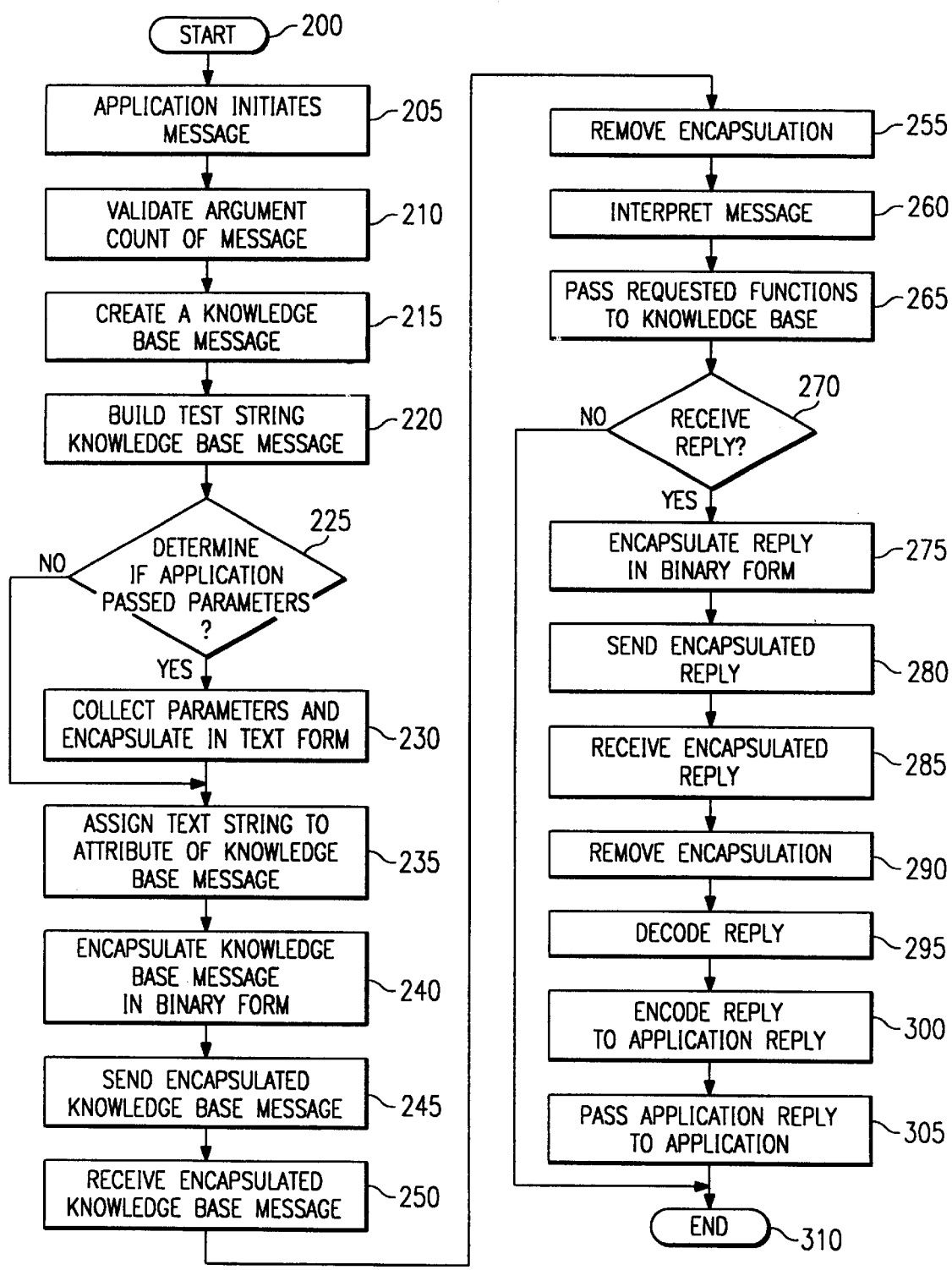
FIG. 4 is a flow chart of a method for communicating with a knowledge base.

The method of the present invention for communicating a message for operating the knowledge base 16 is shown by FIG. 4. The method begins at step 200 and proceeds to step 205. At step 205, the application 20 initiates a message. The application external interface 50 directs the message to the translation engine 52. Next, at step 210, the translation engine 52 validates the message. The message is validated by conducting an argument count in which the arguments of the message are counted and compared to the number of arguments expected for that particular message.

Next, at steps 215–230, the message is translated to a knowledge base message. At step 215, a knowledge base message is created in the translation engine 52 to operate the knowledge base 16. A knowledge base message is created by building a logical representation of the message. At step 220, the message is written into a text string. The text string is an arrangement of information that can be interpreted by the server interface 42. Step 220 leads to decisional step 225.

At decisional step 225, it is determined whether any parameters were passed by the application 20 with the message. If no parameters were passed by the application 20, the NO branch of decisional step 225 leads to step 235.

If parameters were passed by the application 20, the YES branch of decisional step 225 leads to step 230. At step 230 the parameters are collected and encapsulated in the text string with the message. Step 230 also leads to step 235.

Proceeding to step 235, the text string is assigned to an attribute of the knowledge base message. At this point, the text string and the translation are complete and the knowledge base message is passed from the translation engine 52 to the encapsulation engine 54.

At step 240, the knowledge base message is encapsulated in binary form. In encapsulating the knowledge base message, the encapsulation engine 54 maps the message from a logical representation to a physical representation so that it can be sent over the link 44.

If a "MACINTOSH" platform is used with system 7.x, the message may be encapsulated by requesting from the message object a descriptor of the message. In response, the message object systematically invokes the low level operating system 17 functions necessary to build an encapsulated message. The message object invokes the low level functions by using the previously identified "IAC CLASSES". The message object returns with the message in binary form, and as a pointer.

After the knowledge base message has been encapsulated, the pointer for the knowledge base message is passed from the encapsulation engine 54 to the message system 56. Next, at step 245 the message system 56 sends the encapsulated knowledge base message as a pointer reference over the link 44.

Next, at step 250, the encapsulated knowledge base message for operating the knowledge base 16 is received from the link 44 by the message system 58 of the server interface 42. The message system 58 passes the knowledge base message to the encapsulation engine 60. At step 255, the encapsulation engine 60 removes the encapsulation from the knowledge base message. In removing the encapsulation, the encapsulation engine 60 maps the knowledge base message from a physical representation to a logical representation for processing.

Proceeding to step 260, the interpretation engine 62 receives and interprets the knowledge base message as a knowledge base call, or as a series of knowledge base calls, for operations. The interpretation engine 62 passes the knowledge base call to the knowledge base external interface 64. Next, at step 265, the knowledge base external interface 64 passes the knowledge base call to the knowledge base 16, which causes the knowledge base 16 to carry out the called operations.

Next, at decisional step 270, it is determined whether the knowledge base 16 has responded with a reply. If the knowledge base 16 does not respond with a reply, the NO branch of decisional step 270 leads to the end of the process at step 310. If the knowledge base 16 does respond with a reply, the YES branch of decisional step 270 leads to step 275.

At step 275, the reply is encapsulated in binary form. In encapsulating the reply, the encapsulation engine 60 maps the message from a logical representation to a physical representation so that it can be sent over the link 44. If a "MACINTOSH" platform is used with system 7.x, the reply may be encapsulated by requesting from the message object of the reply a descriptor of the reply message. In response, the message object of the reply systematically invokes the low level operating system functions necessary to build an encapsulated reply message. The message object invokes the low level functions by using the previously identified "IAC CLASSES". The message object of the reply returns with the reply in binary form, and as a pointer.

After the reply has been encapsulated, the pointer for the reply is passed from the encapsulation engine 60 to the message system 58. Next, at step 280 the message system 58 sends the encapsulated reply as a pointer reference over the link 44.

Proceeding to step 285, the encapsulated reply is received from the link 44 by the message system 56 of the client interface 40. The message system 56 passes the reply to the encapsulation engine 54. At step 290, the encapsulation engine 54 removes the encapsulation from the reply. In removing the encapsulation, the encapsulation engine 54 maps the reply from a physical representation to a logical representation for processing.

Next, at step 295 the reply, which was constructed by the knowledge base 16, is decoded. At step 300, the reply is encoded to an application reply for return to the application 20. The application reply is then passed to the application 20 by placing the application reply in a memory space established by the application external interface 50.

The method of the present invention for closing a knowledge base is shown by FIG. 5. The method begins at step 400 and proceeds to step 405. At step 405, the application 20 initiates a close server message. The application external interface 50 directs the close server message to the translation engine 52. Next, at step 410, the translation engine 52 validates the message. The message is validated by conducting an argument count in which the arguments of the message are counted and compared to the number of arguments expected for that particular message.

Next, at steps 415–425, the message is translated to a knowledge base message. At step 415, a knowledge base message is created in the translation engine 52 to close the knowledge base 16. A knowledge base message is created by building a logical representation of the close server message. At step 420, the close server message is written into a text string. The text string is an arrangement of information that can be interpreted by the server interface 42. Proceeding to step 425, the text string is assigned to an attribute of the knowledge base message. At this point, the text string and the translation are complete and the knowledge base message is passed from the translation engine 52 to the encapsulation engine 54.

At step 430, the knowledge base message is encapsulated in binary form. In encapsulating the knowledge base message, the encapsulation engine 54 maps the message from a logical representation to a physical representation so that it can be sent over the link 44. If a "MACINTOSH" platform is used with system 7.x, the message may be encapsulated by requesting from the message object a descriptor of the message. In response, the message object systematically invokes the low level operating system 17 functions necessary to build an encapsulated message. The message object invokes the low level functions by using the previously identified "IAC CLASSES". The message object returns with the message in binary form, and as a pointer.

After the knowledge base message has been encapsulated, the pointer for the knowledge base message is passed from the encapsulation engine 54 to the message system 56. Next, at step 435 the message system 56 sends the encapsulated knowledge base message as a pointer reference over the link 44.

Next, at step 440, the encapsulated knowledge base message for closing the knowledge base 16 is received from the link 44 by the message system 58 of the server interface 42. The message system 58 passes the knowledge base message to the encapsulation engine 60. At step 445, the encapsulation engine 60 removes the encapsulation from the knowledge base message. In removing the encapsulation, the encapsulation engine 60 maps the knowledge base message from a physical representation to a logical representation for processing.

Proceeding to step 450, the interpretation engine 62 receives and interprets the knowledge base message as a call to close the knowledge base 16. The interpretation engine 62 passes the close server call to the knowledge base external interface 64. Next, at step 455, the knowledge base external interface 64 passes the close knowledge base call to the knowledge base 16, which causes the knowledge base 16 to close.

As described above, the present invention provides a an apparatus and method for communicating between a knowledge base and an application. The knowledge base incorporates a unified cognition architecture. The application may be an on-line reference program, a computer-based training program, a problem solving program, or another type of program capable of initiating messages for knowledge base operations. The apparatus includes an interface coupled to the knowledge base and to the application. The interface receives and translates messages initiated by the application. Each message is translated to a knowledge base message that is cognizable by the knowledge base. The interface then communicates the knowledge base message to the knowledge base.

Although the present invention has been described with several embodiments, variations may be suggested to one skilled in the art. For example, the workstation 14 may be implemented as a "WINDOWS" platform. If "AUTHORWARE" is used with such an implementation, the suite of messages should include an open session message and a close session message. The open session message establishes connectivity to the server from the calling application. The close session message removes connectivity to the server from the calling application. Thus, it is intended that the present invention encompass such variations within the spirit and scope of the appended claims.

What is claimed is:

1. A knowledge base client, comprising:
   an application operable to initiate a message for a knowledge base having unified cognition architecture and including a plurality of objects each operable to implement a function of the knowledge base;
   a client interface coupled to the application, the client interface operable to receive the message and to translate the message to a knowledge base message by using a suite of knowledge base messages; and
   the knowledge base message operable to invoke a behavior of one of the objects in the knowledge base to implement a function of the knowledge base.

2. The knowledge base client of claim 1, wherein the client interface is further operable to validate the message.

3. The knowledge base client of claim 1, wherein the suite of knowledge base messages comprises:
   a set of one or more knowledge base messages operable to alter the existence of objects in the knowledge base; and
   a set of one or more knowledge base messages operable to set goals for the knowledge base.

4. The knowledge base client of claim 3, wherein the suite of knowledge base messages further comprises a set of one or more knowledge base messages operable to return the status of the knowledge base.

5. The knowledge base client of claim 4, wherein the suite of knowledge base messages further comprises a set of one or more knowledge base messages operable to query objects in the knowledge base.

6. The knowledge base client of claim 5, wherein the suite of knowledge base messages further comprises a set of one or more knowledge base messages operable perform basic operations of the knowledge base.

7. The knowledge base client of claim 6, wherein the set of one or more knowledge base messages operable perform basic operations of the knowledge base comprises:
   an open command operable to launch the knowledge base;
   a load command operable to load the knowledge base;
   a reset command operable to reset the knowledge base to an initial state; and
   a close command operable to shut down the knowledge base.

8. The knowledge base client of claim 5, wherein the set of one or more knowledge base messages operable to query objects in the knowledge base comprises:
   a query object command operable to query objects in the knowledge base; and
   a query attribute command operable to query attributes of objects in the knowledge base.

9. The knowledge base client of claim 3, wherein the set of one or more knowledge base messages operable to alter the existence of objects in the knowledge base comprises:
   an assert command operable to create an object in the knowledge base; and
   a retract command operable to delete an object in the knowledge base.

10. The knowledge base client of claim 3, wherein the set of one or more knowledge base messages operable to invoke behavior of objects in the knowledge base comprises:
    a send command operable to send messages to objects in the knowledge base; and
    a modify command operable to set attributes of objects in the knowledge base.

11. A knowledge base server, comprising:
    a knowledge base having unified cognition architecture and including at least one object operable to implement a function of the knowledge base;
    a server interface operable to receive a knowledge base message including an arrangement of information and parameters for invoking a behavior of the object to implement the function, to generate at least one function call operable to invoke the behavior of the object based on the arrangement of information and parameters in the knowledge base message, and to communicate the function call to the knowledge base, wherein the server interface receives the knowledge base message from a client interface operable to translate a message from an application into the knowledge base message using a suite of knowledge base messages; and
    the knowledge base operable to invoke the behavior of the object based on the function call.

12. The knowledge base server of claim 11, wherein the server interface is modular and operable to receive knowledge base messages initiated by different types of applications.

13. A distributed knowledge base system, comprising:
    a client system, including:
       an application operable to initiate a message for an object of a knowledge base;
       a client interface coupled to the application, the client interface operable to receive the message, to translate the message to a knowledge base message by using a suite of knowledge base messages, and to transmit the knowledge base message over a communication link;

a server system connected to the client system by the communication link, the server system, including:

the knowledge base having unified cognition architecture and including the object;

the object operable to implement a function of the knowledge base;

a server interface operable to receive the knowledge base message, to generate at least one function call operable to invoke a behavior of the object to implement the function based on the knowledge base message, and to communicate the function call to the knowledge base; and the knowledge base operable to invoke the behavior of the object based on the function call.

14. The distributed knowledge base system of claim 13, wherein the knowledge base message includes an arrangement of information and parameters for invoking the behavior of the object, the server interface is operable to generate the function call based on the arrangement of information and parameters in the knowledge base message.

15. The distributed knowledge base system of claim 13, wherein the server interface is modular and operable to receive knowledge base messages initiated by different types of applications.

16. The distributed knowledge base system of claim 13, wherein the suite of knowledge base messages comprises:

a set of one or more knowledge base messages operable to alter the existence of objects in the knowledge base;

a set of one or more knowledge base messages operable to set goals for the knowledge base;

a set of one or more knowledge base messages operable to return the status of the knowledge base;

a set of one or more knowledge base messages operable to query objects in the knowledge base; and a set of one or more knowledge base messages operable perform basic operations of the knowledge base.

17. A method for communicating between an application and a knowledge base having unified cognition architecture and including at least one object operable to implement a function of the knowledge base, the method comprising:

receiving, at a client interface, a message initiated by the application for invoking a behavior of the object to implement the function of the knowledge base;

translating the message to a knowledge base message by using a suite of knowledge base messages, the knowledge base message including an arrangement of information and parameters;

sending the knowledge base message from the client interface to a server interface;

receiving, at the server interface, the knowledge base message;

generating at least one function call operable to invoke the behavior of the object based on the arrangement of information and parameters in the knowledge base message;

communicating the function call to the knowledge base; and invoking the behavior of the object to implement the function of the knowledge base.

18. The method of claim 17, wherein the knowledge base message is a status message operable to return the status of the knowledge base.

19. The method of claim 17, further comprising:

receiving, at the server interface, a reply from the knowledge base;

sending the reply from the server interface to the client interface;

receiving, at the client interface, the reply;

translating the reply to an application reply cognizable by the application; and communicating the application reply to the application.

20. A method for communicating between an application and a knowledge base having unified cognition architecture and including at least one object operable to implement a function of the knowledge base, the method comprising:

receiving, at a client interface, a message initiated by the application for invoking a behavior of the object to implement the function of the knowledge base, the message including at least one parameter;

providing a suite of object-oriented knowledge base messages at the client interface;

generating a knowledge base message at the client interface by selecting from the suite of knowledge base messages the knowledge base message corresponding to the message and encapsulating the parameter of the message into the knowledge base message, the knowledge base message including an arrangement of information and the parameter;

sending the knowledge base message from the client interface to a server interface;

receiving, at the server interface, the knowledge base message;

generating at the server interface at least one function call operable to invoke the behavior of the object based on the arrangement of information and the parameter in the knowledge base message;

communicating the function call to the knowledge base; and invoking the behavior of the object to implement the function of the knowledge base.

* * * * *